United States Patent [19]
Yoshida et al.

[11] Patent Number: 5,507,865
[45] Date of Patent: Apr. 16, 1996

[54] AQUEOUS INK

[75] Inventors: Naohiro Yoshida, Fukuoka; Nobuyoshi Sato, Tokyo, both of Japan

[73] Assignee: Mitsubishi Chemical Corporation, Tokyo, Japan

[21] Appl. No.: 360,041

[22] Filed: Dec. 20, 1994

[30]     Foreign Application Priority Data

Dec. 20, 1993  [JP]  Japan ..................... 5-319759

[51] Int. Cl.$^6$ .................................................. C09D 11/02
[52] U.S. Cl. ..................... 106/22 H; 106/20 D
[58] Field of Search ................. 106/22 H, 20 D

[56]          References Cited

U.S. PATENT DOCUMENTS

| | | | |
|---|---|---|---|
| 4,632,703 | 12/1986 | Koike et al. | 106/22 D |
| 5,242,489 | 9/1993 | Schwarz, Jr. | 106/20 D |
| 5,245,159 | 10/1993 | Gundlach et al. | 106/22 H |
| 5,279,652 | 1/1994 | Kaufmann et al. | 106/22 F |

FOREIGN PATENT DOCUMENTS 295292  11/1993  Japan .

*Primary Examiner*—Helene Klemanski
*Attorney, Agent, or Firm*—Sughrue, Mion, Zinn, Macpeak & Seas

[57]          ABSTRACT

An aqueous ink comprising at least a water-soluble dye, water, and a basic amino acid, and a method for ink-jet recording which comprises issuing droplets of the aqueous ink from an ejection orifice, and adhering the droplets onto a receiving material.

8 Claims, No Drawings

AQUEOUS INK

FIELD OF THE INVENTION

The present invention relates to an aqueous ink. More particularly, the present invention relates to an aqueous ink which, when used in recording, gives a high-quality recorded image having improved water resistance and a satisfactory image density and prevented from suffering a bronzing phenomenon, which has been severe in recording with conventional black inks.

BACKGROUND OF THE INVENTION

Most of the conventional inks are classified into pigment inks and dye inks. Pigment inks have been used in a variety of fields because they are superior to dye inks in light resistance and water resistance and are capable of forming satisfactory recorded images which suffer neither discoloration nor fading. However, the pigment inks at present have the problem of poor ink stability. Specifically, the pigment tends to aggregate with the lapse of time, and this aggregation causes clogging at a pen point or nozzle of an ink jet printer or causes precipitation during ink storage.

On the other hand, dye inks are free from the aggregation and related problems. Hence, the dye inks are extensively investigated and are also utilized in a variety of fields, for example, in non-impact recording methods, which have an advantage of little printing noise. Exceedingly promising among such recording methods is ink-jet recording, by which high-speed recording is possible and recording can be conducted on so-called plain paper without any special treatment for fixation. Various techniques of ink-jet recording have been devised so far; some of these have come into commercial use after being improved, while others are still in the stage of continuous efforts at practical use.

Although either pigment inks or dye inks are usable as inks for such recording techniques, pigment inks have the stability problem and the like problems described above. Hence, dyes are frequently used for avoiding such problems. However, an ink containing a water-soluble dye are unsatisfactory in water resistance, although excellent in stability during storage and ejection. Another problem of these inks is the so-called bronzing phenomenon in which a recorded image formed by using a dye ink becomes light-reflective, as it dries, and comes to have a yellow to brown metallic luster because of the deposition of dye crystals on the paper. Since the recorded image in which the bronzing phenomenon is observed is light-reflective, the recorded image not only has a reduced density but also has a tone considerably different from the desired one.

A known technique for preventing the bronzing phenomenon is to incorporate N-hydroxyethylmorpholine or an alkanolamine, e.g., monoethanolamine, diethanolamine or triethanolamine, into an ink. However, this prior art ink has a drawback because the incorporation of these additives heighten the pH of the ink to 11 or higher even when the additive amount of them is small. Specifically, this high-pH ink has problems concerning ejection, including the corrosion of nozzles which come into contact with the ink, and is also defective in safety in case of accidental touching to the ink during handling. The incorporation of these additives has another problem that it reduces the water resistance of the ink, even though effective in diminishing the bronzing phenomenon. Thus, any truly satisfactory aqueous ink has not been obtained.

An ink for writing utensils, e.g., felt pens, and for other uses is disclosed in JP-A-5-295292, which ink contains a water-soluble dye as a colorant, an amino acid, e.g., L-alanine or glycine, and a resin of an amino acid derivative. (The term "JP-A" as used herein means an "unexamined published Japanese patent application.") In this reference, however, any embodiment containing a basic amino acid is not described, and there are also no descriptions therein concerning improvement in the color density and water resistance of recorded images and the prevention of the bronzing phenomenon.

SUMMARY OF THE INVENTION

An object of the present invention is to provide an aqueous ink that, even when used in recording on plain paper, retains water resistance and that does not undergo the bronzing phenomenon and gives a print bearing a high-density clear recorded image and having sufficient contrast.

Another object of the present invention is to provide a method for ink-jet recording by using the above aqueous ink.

Other objects and effects of the present invention will be apparent from the following description.

The present invention provides an aqueous ink comprising at least a water-soluble dye, water, and a basic amino acid. The basic amino acid is preferably selected from lysine and arginine.

The present invention also provides a method for ink-jet recording which comprises: issuing droplets of the above aqueous ink from an ejection orifice; and adhering the droplets onto a receiving material.

DETAILED DESCRIPTION OF THE INVENTION

The water-soluble dye for use in the present invention is not particularly limited. Examples thereof include the acid dyes, direct dyes, and basic dyes enumerated in the Color Index, and further include the water-soluble dyes known as colorants for aqueous inks. Preferred of these are azo dyes and phthalocyanine dyes. From the standpoint of diminishing the bronzing phenomenon, the aqueous ink is more effective when it contains a black dye, since the bronzing phenomenon is severe in black inks.

Specific examples of the azo dyes include the dyes, the free acid forms of which are represented by formulae (A), (B), and (C):

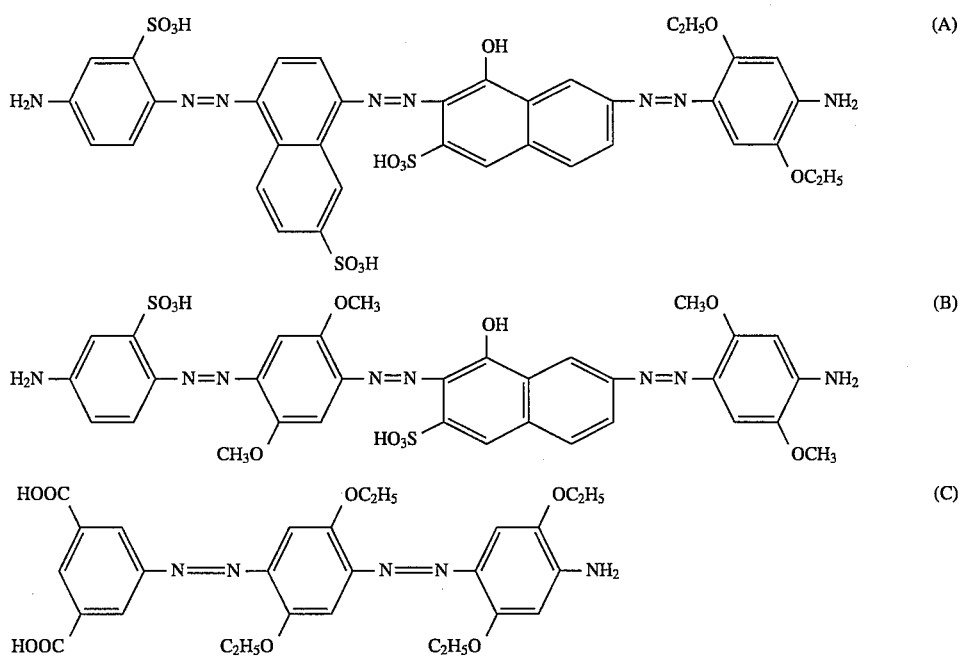

Specific examples of the preferred phthalocyanine dyes include the dyes, the free acid form which is represented by formula (D):

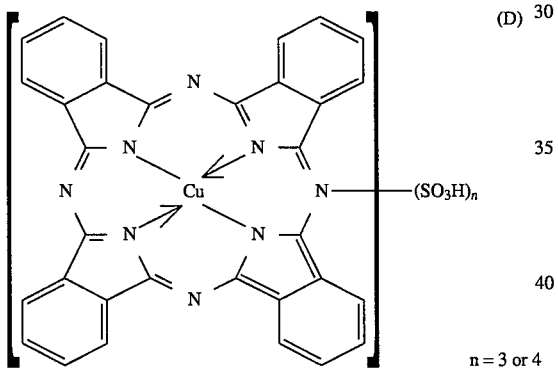

n = 3 or 4

The dyes specified above are mere examples of the water-soluble dye for use in the present invention, and a large number of dyes including not only dyes having the same basic skeleton as any of the above-specified dyes but also dyes with a different basic skeleton are usable in the present invention.

The concentration of these water-soluble dyes in the aqueous ink is usually from 0.1 to 20% by weight, preferably from 0.3 to 10% by weight, more preferably from 1 to 5% by weight, based on the total amount of the aqueous ink.

These water-soluble dyes may be used either alone or in combination of two or more thereof.

Preferred examples of the basic amino acid for use in the present invention include arginine, lysine, histidine, ornithine, and derivatives thereof formed by incorporating one or more substituents into the alkylene groups thereof. More preferred are arginine, lysine, and histidine. Especially preferred are lysine and arginine. Examples of the substituents for such basic amino acids include a substituted or unsubstituted alkyl group, a hydroxy group, a halogen atom, and a phenyl group. The concentration of these basic amino acids in the aqueous ink is usually from 0.01 to 20% by weight, preferably from 0.1 to 10% by weight, more preferably from 1 to 5% by weight, based on the total amount of the aqueous ink. If the concentration thereof is above 20% by weight, the ink may suffer precipitation or cause nozzle clogging. If the concentration thereof is lower than 0.01% by weight, the effects of the present invention tends not to be obtained sufficiently. These basic amino acids may be used either alone or in combination of two or more thereof.

Into the aqueous ink of the present invention, water and any of known various water-soluble organic solvents and additives may be incorporated in an ordinary way. Examples of the water-soluble organic solvents include dimethyl sulfoxide; dimethylformamide; ketones, e.g., acetone and methyl ethyl ketone; glycols, e.g., ethylene glycol, diethylene glycol, propylene glycol, polyethylene glycol, thiodiglycol, glycerol, and 1,2,6-hexanetriol; glycol ethers, e.g., ethylene glycol monomethyl ether, diethylene glycol monomethyl ether, and ethylene glycol monobutyl ether; alkanolamines, e.g., triethanolamine and ethyldiethanolamine; alcohols, e.g., methanol, ethanol, 1-propanol, and 2-propanol; and N-hydroxyethylmorpholine, N-methyl-2-pyrrolidone, and the like. These water-soluble organic solvents may be used either alone or in combination of two or more thereof. The concentration of these water-soluble organic solvents in the aqueous ink is usually from 1 to 40% by weight, preferably from 3 to 30% by weight, more preferably from 5 to 20% by weight, based on the total amount of the aqueous ink. If the concentration thereof exceeds 40% by weight, blurring of recorded images tends to occur, resulting in impaired print quality. If the concentration thereof is lower than 1% by weight, the ink tends to cause ejection orifice clogging and recorded images generally are sometimes impaired in penetration and drying properties.

The aqueous ink of the present invention may further contain, if desired or necessary, other additives such as a wetting agent, a surfactant, a pH regulator, an antiseptic, a mildew-proofing agent, an evaporation accelerator, and a chelating agent. Examples of the wetting agent include urea and thiourea.

The aqueous ink of the present invention can be prepared by mixing and dissolving the ingredients described above and treating the solution by a known method.

The aqueous ink of the present invention is usable in applications such as writing utensils (e.g., fountain pens, felt pens, ball-point pens employing aqueous ink, and marking felt pens employing aqueous ink) and ink-jet recording. The aqueous ink of the present invention is especially suited for ink-jet recording, because higher water resistance and the prevention of bronzing are strongly desired in ink-jet recording, since this recording technique can produce high-quality high-definition images due to recording with minute ink droplets, is inexpensive as compared with thermal transfer recording and other recording techniques, and is hence widely used in offices and for producing full-color images.

For use in this ink-jet recording, the aqueous ink should, of course, be filtered or otherwise treated so as to avoid nozzle clogging or other troubles. In addition, the aqueous ink should be regulated to have a pH of 11 or lower, preferably from 7 to 10, from the standpoints of the prevention of printer corrosion and safety.

An ink-jet recording techniques which can be used in the present invention includes an on-demand printing method, in which ink droplets are ejected only on demand, for example, by means of a piezoelectric element and a bubble-jet system in which an ink is ejected from the nozzle by pressure caused by bubbles formed by heating. The ink-jet recording method of the present invention is not limited to the above. The ink-jet recording techniques are described in detail, e.g., in JP-A-54-51837 and JP-A-55-75465, which are incorporated herein by reference.

The present invention will be explained below in more detail by reference to the following Examples, but the invention should not be construed as being limited thereto.

EXAMPLE 1

A recording liquid having the following composition was prepared using the lithium salt of water-soluble azo dye (A1), which salt is represented by the above-described structural formula (A) wherein the hydrogen atom in each sulfo group was replaced with a lithium atom. The components were mixed and stirred for about 4 hours, and the resulting mixture was then filtered under pressure through a membrane filter having a pore size of 0.2 μm (trade name H020A047A, manufactured by Advantec Co.). Thus, an aqueous ink according to the present invention was produced. This aqueous ink was subjected to evaluation tests, and the results obtained are shown in Table 1 given later.

| Components | |
| --- | --- |
| Water-soluble azo dye (A1) (lithium salt) | 3.0 wt % |
| L-lysine | 1.9 wt % |
| Diethylene glycol | 12.0 wt % |
| N-methyl-2-pyrrolidone | 5.0 wt % |
| 2-Propanol | 3.0 wt % |
| Desalted water | 75.1 wt % |
| total | 100.0 wt % |

EXAMPLE 2

An aqueous ink was prepared in the same manner as in Example 1, except that 1.8 wt % of L-arginine was used as an amino acid in place of L-lysine and the amount of desalted water was increased so as to result in a total amount of 100.0 wt %. This aqueous ink was subjected to the evaluation tests, and the results obtained are shown in Table 1.

COMPARATIVE EXAMPLE 1

An aqueous ink was prepared in the same manner as in Example 1, except that L-lysine was omitted and the amount of desalted water was increased so as to result in a total amount of 100.0 wt %. This aqueous ink was subjected to the evaluation tests, and the results obtained are shown in Table 1.

Evaluation of Aqueous Inks

The aqueous inks prepared in the Examples and Comparative Example given above were used in printing with ink-jet printer HG-800 (trade name, manufactured by Epson Co.). The prints were subjected to the following tests to evaluate the performance of the aqueous inks.

(i) Recorded-image density and water resistance:

A recorded image sample (solid print) was dried for 24 hours, and then examined for O.D. (optical density) with a Macbeth reflective densitometer (RD-914) to determine the initial O.D. value. The same sample was immersed for 5 minutes in 25° C. tap water contained in a vessel, dried, and then examined for O.D. to determine the after-test O.D. value. The ratio of the O.D. value before test to that after test determined by the following equation is referred to as O.D. ratio. O.D. ratios close to 1 indicate that water resistance is satisfactory.

O.D. ratio=(after-test O.D. value)/(initial O.D. value)

(ii) Water resistance test:

A recorded image sample (bearing characters) was dried for 24 hours, immersed for 5 seconds in 25° C. tap water contained in a vessel, subsequently withdrawn therefrom, and then dried. The degree of blurring of the characters were visually judged.

A: substantially no blurring

B: some blurring

C: blurring (iii) Bronzing:

A recorded image sample-(solid print) was dried for 24 hours, and the degree of bronzing was visually judged.

A: completely no bronzing phenomenon

B: some bronzing phenomenon observed

C: considerable bronzing phenomenon observed

The occurrence of the bronzing phenomenon can be also ascertained by a decrease in printed-character density (O.D.).

TABLE 1

| | Dye | Amino acid | Initial O.D. value | O.D. ratio | Water resistance | Bronzing |
| --- | --- | --- | --- | --- | --- | --- |
| Example 1 | (A1) | L-lysine | 1.23 | 0.98 | A | A |
| Example 2 | (A1) | L-arginine | 1.16 | 0.99 | A | A |
| Comparative Example 1 | (A1) | none | 1.03 | 0.95 | B | C |

The same procedure as in each of the above Examples is carried out, except that each of dyes, the free acid forms of which are represented by formulae (B) to (D) is used in place of dye (A1). As a result, excellent results are obtained likewise.

EXAMPLE 3 AND COMPARATIVE EXAMPLES 2 TO 7

Aqueous inks were prepared and evaluated in the same manner as in Example 1, except that the aqueous ink composition was changed as follows. In Comparative Example 7 in which monoethanolamine was used instead of the amino acid, the resulting ink had a high pH value of 12.0. The results obtained are shown in Table 2 below.

| Composition | |
|---|---|
| Water-soluble dye (A1) (lithium salt) | 3.0 wt % |
| Amino acid | 1.0 wt % |
| Diethylene glycol | 12.0 wt % |
| N-methylpyrrolidone | 5.0 wt % |
| Isopropyl alcohol | 3.0 wt % |
| Desalted water | 76.0 wt % |
| total | 100.0 wt % |

TABLE 2

| | Dye | Amino acid | Initial O.D. value | O.D. ratio | Water resistance | Bronzing |
|---|---|---|---|---|---|---|
| Example 3 | (A1) | L-lysine | | | A | A |
| Comparative Example 2 | (A1) | DL-phenyl-alanine*[1] | 0.95 | 0.99 | B | B |
| Comparative Example 3 | (A1) | DL-serine*[2] | 1.00 | 0.99 | C | A |
| Comparative Example 4 | (A1) | Laurylmethyl-aminoacetic acid*[3] | 0.90 | 0.99 | B | B |
| Comparative Example 5 | (A1) | L-cystine*[4] | 0.95 | 0.99 | B | B |
| Comparative Example 6 | (A1) | DL-alanine*[5] | 1.00 | 0.99 | A | C |
| Comparative Example 7*[6] | (A1) | monoethanol-amine | 1.30 | 0.98 | B | A |

Note:
*[1]neutral amino acid
*[2]neutral amino acid
*[3]neutral amino acid derivative
*[4]sulfur-containing amino acid
*[5]neutral amino acid
*[6]The resulting ink had a high pH value of 12.0.

COMPARATIVE EXAMPLES 8 AND 9

Aqueous inks were prepared and evaluated in the same manner as in Example 1, except that the aqueous ink composition was changed as follows. In Comparative Example 9 in which L-cystine was used as the amino acid, a portion of L-cystine was not dissolved and remained. The results obtained are shown in Table 3 below.

| Composition | |
|---|---|
| Water-soluble dye (A1) (lithium salt) | 3.0 wt % |
| Amino acid | 2.0 wt % |
| Diethylene glycol | 12.0 wt % |
| N-methylpyrrolidone | 5.0 wt % |
| Isopropyl alcohol | 3.0 wt % |
| Desalted water | 75.0 wt % |
| total | 100.0 wt % |

TABLE 3

| | Dye | Amino acid | Initial O.D. value | O.D. ratio | Water resistance | Bronzing |
|---|---|---|---|---|---|---|
| Comparative Example 8 | (A1) | DL-alanine | 1.04 | 0.99 | A | C |
| Comparative Example 9 | (A1) | L-cystine | 1.04 | 0.99 | B | C |

The neutral amino acids and their derivatives used in the above Comparative Examples are given in Examples and other descriptions of JP-A-5-295292. However, these comparative aqueous inks each had an exceedingly low recorded-image density, although some of these were slightly effective in water resistance and prevention of the bronzing phenomenon. Thus, the aqueous inks of the Comparative Examples were less effective than the aqueous ink of the present invention which contained a basic amino acid.

According to the present invention, a highly stable aqueous ink which gives a high-quality recorded image having improved water resistance and a satisfactory image density and free from the bronzing phenomenon can be obtained by incorporating a basic amino acid into the ink.

While the invention has been described in detail and with reference to specific embodiments thereof, it will be apparent to one skilled in the art that various changes and modifications can be made therein without departing from the spirit and scope thereof.

What is claimed is:

1. A method for ink-jet recording which comprises: issuing droplets of an aqueous ink from an ejection orifice; and adhering said droplets onto a receiving material, said aqueous ink comprising at least a water-soluble dye, water, and a basic amino acid.

2. The method as claimed in claim 1, wherein said amino acid is selected from lysine and arginine.

3. The method as claimed in claim 1, wherein said water-soluble dye is selected from an azo dye and a phthalocyanine dye.

4. The method as claimed in claim 1, wherein said water-soluble dye is of a black color.

5. The method as claimed in claim 1, wherein the content of said basic amino acid is from 0.01 to 20% by weight based on the total amount of said aqueous ink.

6. The method as claimed in claim 1, wherein the content of said water-soluble dye is from 0.1 to 20% by weight based on the total amount of said aqueous ink.

7. The method as claimed in claim 1, which further contains a water-soluble organic solvent.

8. The method as claimed in claim 7, wherein the content of said water-soluble organic solvent is from 1 to 40% by weight based on the total amount of said aqueous ink.

* * * * *